(12) United States Patent
Brown et al.

(10) Patent No.: US 6,226,431 B1
(45) Date of Patent: May 1, 2001

(54) OPTICAL FIBER CABLE

(75) Inventors: Robert J Brown; Clyde J. Lever, Jr., both of Buford; Kenneth L. Taylor, Jr., Lawrenceville, all of GA (US)

(73) Assignee: Lucent Technology Inc., Murray Hill, NJ (US)

( * ) Notice: Subject to any disclaimer, the term of this patent is extended or adjusted under 35 U.S.C. 154(b) by 0 days.

(21) Appl. No.: 09/342,435

(22) Filed: Jun. 29, 1999

(51) Int. Cl.$^7$ .................................................. G02B 6/44
(52) U.S. Cl. ........................ 385/114; 385/109; 385/110; 385/112
(58) Field of Search .................... 385/109, 110, 385/114, 112

(56) References Cited

U.S. PATENT DOCUMENTS

| | | | |
|---|---|---|---|
| 4,082,423 | * 4/1978 | Glista | 385/103 |
| 4,432,605 | * 2/1984 | Niiro | 385/111 |
| 4,504,112 | * 3/1985 | Gould | 385/102 |
| 4,696,542 | * 9/1987 | Thompson | 385/108 |
| 4,740,053 | 4/1988 | Cassidy . | |
| 4,976,519 | * 12/1990 | Davey | 385/102 |
| 5,062,685 | 11/1991 | Cain et al. . | |
| 5,138,684 | 8/1992 | Bullock et al. . | |
| 5,229,851 | * 7/1993 | Rahman | 385/114 |
| 5,369,720 | 11/1994 | Parry et al. . | |
| 5,675,686 | * 10/1997 | Rosemayer | 385/114 |
| 5,698,615 | 12/1997 | Polle . | |
| 5,777,260 | 7/1998 | Klumps et al. . | |
| 5,905,833 | * 5/1999 | Sheu | 385/109 |

FOREIGN PATENT DOCUMENTS

| | | |
|---|---|---|
| 29 29 968 A1 | 2/1981 | (DE) . |
| 0 752 603 A1 | 1/1997 | (EP) . |
| 0 874 261 A2 | 10/1998 | (EP) . |
| 56057005 | 5/1981 | (JP) . |

* cited by examiner

*Primary Examiner*—Cassandra Spyrou
*Assistant Examiner*—Leo Boutsikaris
(74) *Attorney, Agent, or Firm*—Alston & Bird LLP

(57) ABSTRACT

An optical fiber cable which is constructed so as to minimize optical transmission loss, and which comprises one or more compliant core units retained within a surrounding sheath. Each compliant core unit is composed of a bundle of parallel optical fibers, such as a stack of ribbons, enclosed in and supported by a compliant unitizing structure. The structure may derive its compliance from a foamed material, such as polyethylene, that is extruded to surround the fiber bundle. The foam material sufficiently cushions the bundle of fibers from external stresses that are applied when the cable is bent or encounters compressive loading.

9 Claims, 5 Drawing Sheets

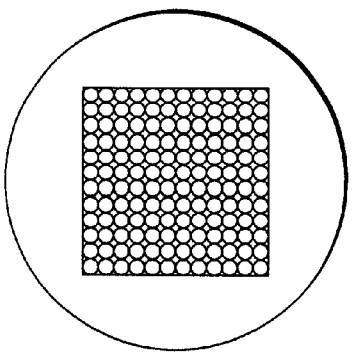
Fig. 3A ROUND
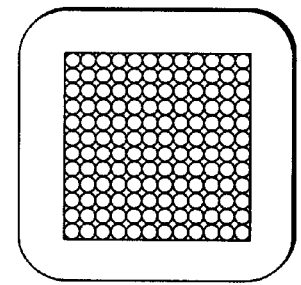
Fig. 3B RECTANGULAR (ROUNDED EDGES OPTIONAL)
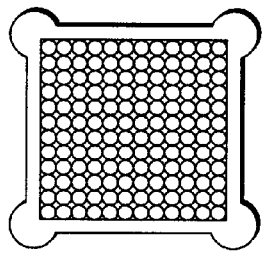
Fig. 3C CORNER FIBER LOBES
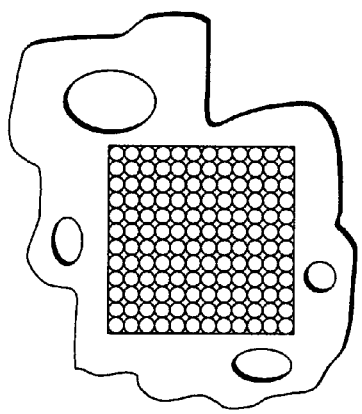
Fig. 3D TILED OR INTERLOCKING PATTERN
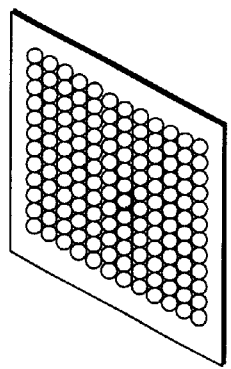
Fig. 3E SKEWED
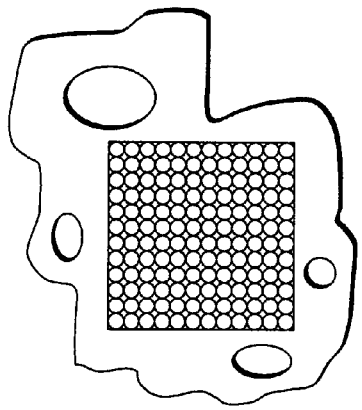
Fig. 3F GENERAL OPTIMIZED SHAPE

OPTICAL FIBER CABLE

BACKGROUND OF THE INVENTION

The present invention relates to an optical fiber cable having an improved capability for isolating the fibers from external stresses which can result in optical transmission losses or stress corrosion leading to fiber fracture.

Optical fibers are composed of very thin strands of pure silica or glass, and they can be characterized as perfectly elastic-brittle in their mechanical behavior. In order to provide the fibers with protection from external stresses which might cause them to fracture, it has been conventional to coat the fibers with a protective material, such as a thick layer of a rapidly curing polymeric material. As noted in U.S. Pat. No. 5,675,686 such protective material protects the bare fibers from the stresses incurred during shipping and processing. Also, the coated optical fibers may be surrounded with a buffer material, such as expanded PTFE which may be bonded to the coated optical fiber.

It is an object of the present invention to provide an improved optical fiber cable in which the novel compliant unitizing structures minimize both the loads transferred to the fibers and the displacements enforced upon the fibers during the processes and loadings of production, handling, and installation of the cable, so as to enable the design of dry core, high fiber count (HFC) cables with minimum optical transmission loss induced by microbending and/or macrobending of the fibers.

It is also an object to increase fiber packing density for HFC designs by permitting more fibers to be enclosed within a given cable diameter.

SUMMARY OF THE INVENTION

The above and other objects and advantages of the present invention are achieved by the provision of an optical fiber cable which comprises one or more compliant core units enclosed within a supporting outer sheath. Each of the compliant core units comprises at least one optical fiber enclosed in and supported by a compliant unitizing structure. Such a structure may be constructed from a highly expanded polymeric foam, or a material having an elastic response substantially the same as that of a highly expanded polymeric foam. The core units are retained in the outer sheath under a compressive deformation, but so as to permit relative movement therebetween.

The elastic response of the foam as employed with the present invention is characterized by a nearly constant, relatively low stress for compressive strains up to about 60%.

In a preferred embodiment, each of the compliant core units comprises a bundle of parallel optical fibers, such as a ribbon or linear array of multiple fibers.

BRIEF DESCRIPTION OF THE DRAWINGS

Some of the objects and advantages of the present invention having been stated, others will appear as the description proceeds, when considered in conjunction with the accompanying drawings, in which:

FIGS. 3A through 3F illustrate the cross sections of several possible compliant core units suitable for use in the present invention;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
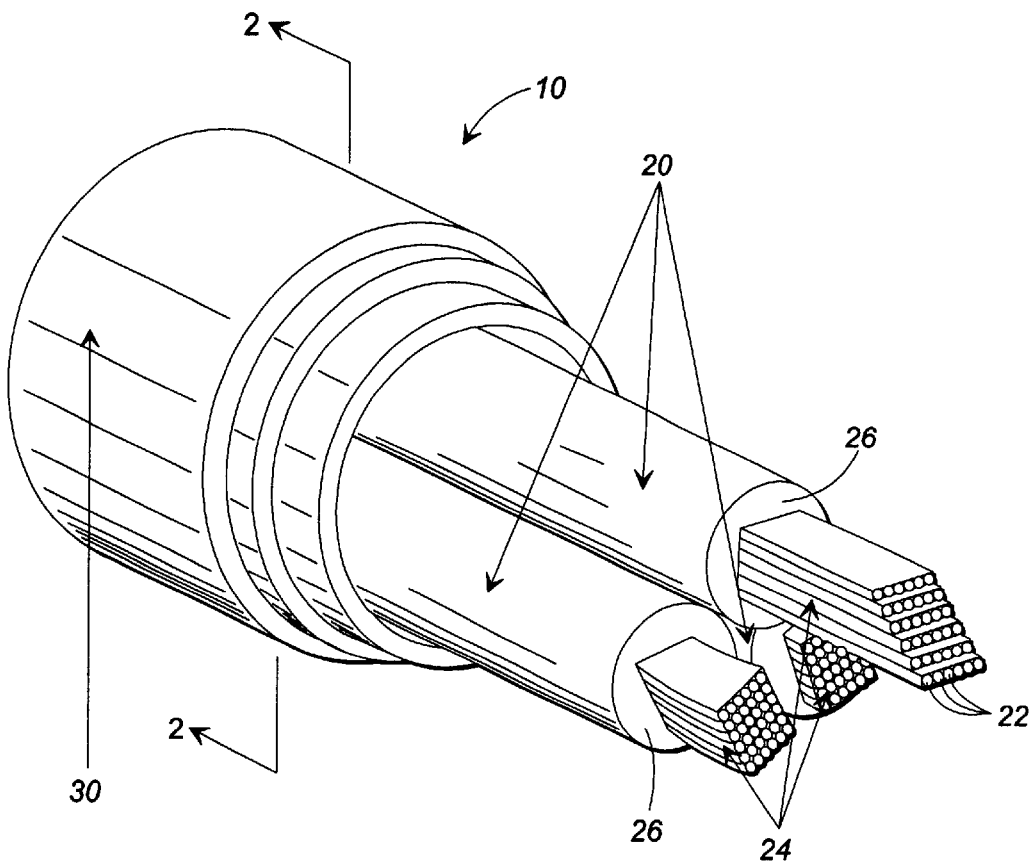
FIG. 1 is a perspective view of an optical fiber cable which embodies the features of the present invention.
Figure 2:
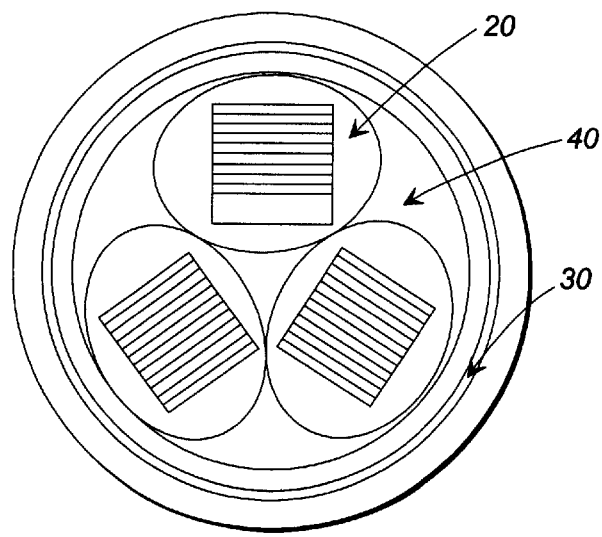
FIG. 2 is an enlarged sectional view taken along line 2—2 in FIG. 1.

Referring more particularly to the drawings, FIGS. 1–2 illustrate an optical fiber cable 10 which embodies the present invention, and which comprises three compliant core units 20, retained within a conventional outer sheath 30. Each compliant core unit 20 is composed of a bundle of parallel optical glass fibers 22, which in the illustrated embodiment is composed of six stacked ribbons 24, with six optical fibers arranged in a laterally aligned array in each ribbon. More particularly, the six fibers of each ribbon are coated with a conventional matrix, such as an acrylate-based material, to form an integral structure. The number of fibers per ribbon, ribbons per core unit, and core units per cable are not restricted to that shown in the figures. The fibers 22 are of a size commonly used in optical fiber cables, and typically have a diameter of about 250 $\mu$m (microns).

Each stack of ribbons is enclosed in and supported by a compliant unitizing structure, embodied here as a highly expanded (and thus low density) polymeric foam 26, which sufficiently cushions the fibers from external stresses that are applied when the cable is bent or encounters compressive loading. The unitizing structure serves to hold the ribbons in their stacked relation, and no adhesive or the like is required to hold the ribbons together. The core i.e. the fibers or ribbons, may be retained under compression by the unitizing structure, but are not otherwise secured to the unitizing structure or each other. Thus the fibers and/or ribbons comprising the core are free to move relative to the unitizing structure and relative to each other. Also, the core may be straight or stranded within the unitizing structure. The foam comprising the unitizing structure may be extruded about the stack of ribbons, utilizing well known extrusion equipment and techniques.

The outer surrounding sheath 30 may comprise any conventional cable construction which may include a core tube, armor, strength members, rods, tapes, rovings, ripcords, and outer jackets, all as known in the art. The flexural properties of such a construction will generally exceed those of the fibers or ribbons. However, the relatively low compliance of the unitizing structure effectively decouples the core from the sheath. Consequently, there is not a one-to-one kinematic coupling of flexural displacement between the core and sheath. The core units may be retained under compression by the outer sheath, note FIG. 2, but the core units are not otherwise secured to the outer sheath or each other. Thus the core units are free to move relative to the outer sheath and relative to each other. Also, the core units may be straight (as illustrated) or stranded within the outer sheath.

In the illustrated embodiment, the outer sheath comprises three distinct concentric layers, which may for example comprise an inner layer composed of a polymeric core tube, an intermediate layer composed of strength members and/or armor, and an outer layer composed of a polymer jacket. Also, as best seen in FIG. 2, a void may be formed between the units and the outer sheath, as indicated at 40, and the outer sheath retains the core units under a compressive deformation.

An important feature of the unitizing structure is that it exhibits large deformations for relatively low loading. While a unitizing structure which includes a foamed material as further described herein is preferred since it represents a readily achievable realization of this concept, other structures are possible. From basic principles of solid mechanics, it is well established that stiffness is a result of both the structure's geometry and the material. A solid structure made from a near-incompressible material such as rubber will not produce the desired load-deformation characteristics. However, if structural features that can buckle are incorporated (such as ribs, fins, pins, beams, fingers, membranes, etc.) then a near-incompressible linear elastic material could be used. The key is to create a design with the desired post-buckling load-deformation characteristics. In the case of a foamed material, the structural features that buckle and collapse are fabricated on a microscopic scale, in the form of the cell walls and membranes created during the foaming process.

On a micro-mechanical scale, the foamed material cell size should be sufficiently small relative to the characteristic geometry of the fibers in order to achieve near uniform load transfer between the fiber and foam material. The cell size spacing should also be of a sufficiently random nature, or else be a non-harmonic length with respect to the fiber transmission process in order that the locations of micro-contact not create optical loss based on microbending induced by the periodic loading.

Figure 4:
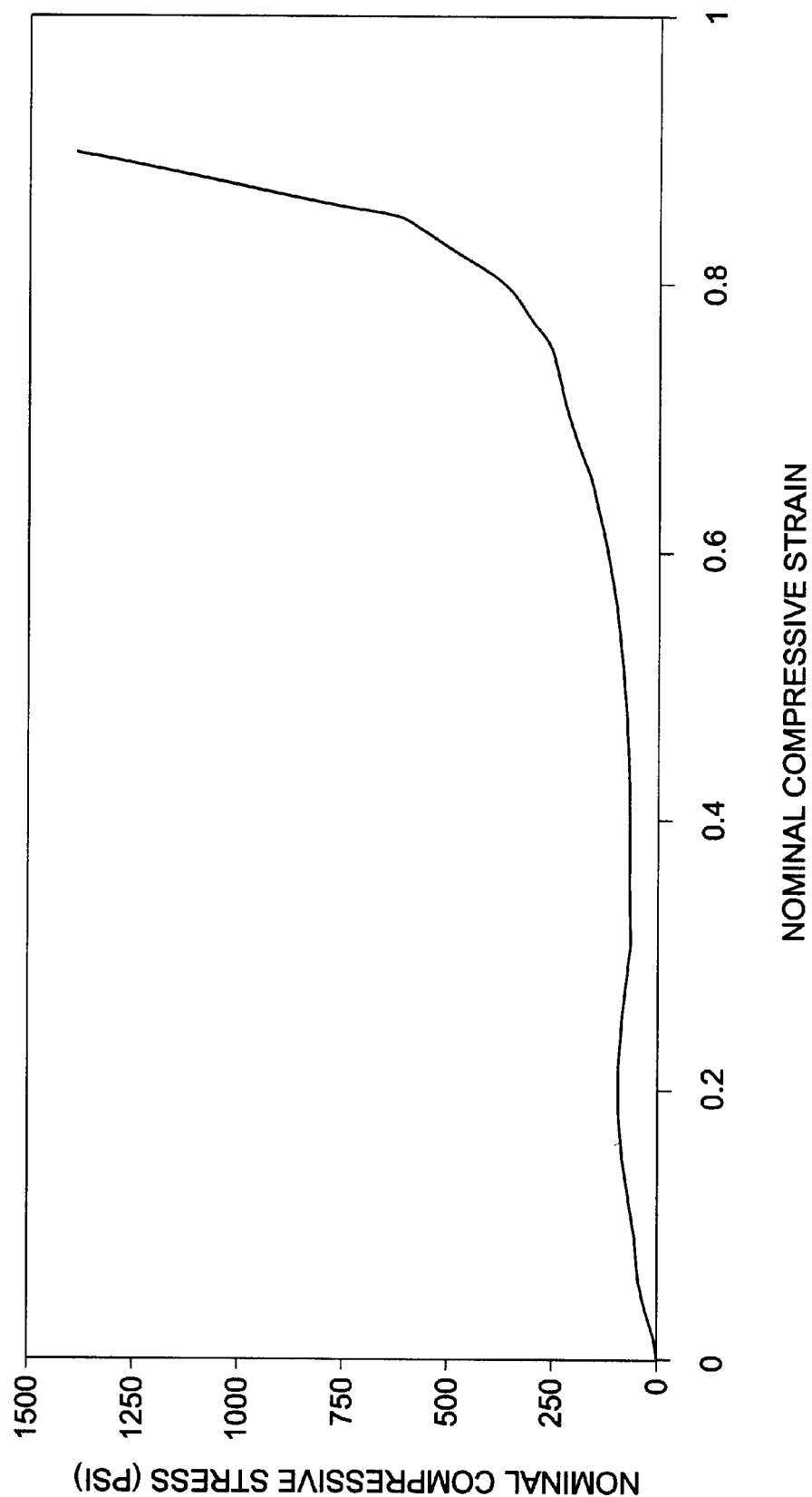
FIG. 4 is a compressive stress-strain diagram for a highly expanded polymeric foam of the type used in the present invention.

On a macro-mechanical scale, the material should exhibit the compression test characteristics classically associated with foams. FIG. 4 illustrates a plot of compression stress versus strain that is typical of the desired foam behavior. For small strains (<0.05), there is an initial rise that corresponds to small, linear elastic deformations of the cell structures. With increased loading, the cell walls collapse and buckle, and strain increases to large amounts for minimal increase in load. The curve is nearly horizontal for strains as high as 60%, with the nominal stress plateau below 100 psi, depending on the cellular structure and base polymer. As the cells fully collapse and the walls contact each other directly, the curve takes on a sharp upward slope.

Additionally, the material must exhibit successful properties over temperature and time. The material should also exhibit low strength, so that it is easily removed to expose the ribbons for splicing.

FIGS. 3A through 3F illustrate some representative shapes the core units can assume. The scope of this invention encompasses not only these shapes, but any combinations or derivatives of them as well. The round shape represents a straightforward extruded shape that freely allows the stack to be stranded. The rectangular shape uses less material, and may have rounded edges. The lobed corner design provides extra protection against loss for the corner fibers, while removing unnecessary material on the edges. The tiled or interlocking pattern suggests a shape that promotes both fiber loss protection and unit organization within the cable. The skewed shape suggests that ribbon patterns other than prismatic stacks are possible, including radially fanned shapes. The general optimized shape illustrates the use of irregular shapes and internal voids or fillers to achieve the desired performance.

A skin may be desired on the exterior of the core units to promote robust handling qualities and enhanced water blocking abilities. The goal of the unitizing structure is to provide a compliant suspension of the ribbon stack that conforms to the geometries of both the cable interior and the ribbon stack with relatively low load transmission between the cable and the optical fibers. Consequently, crush resistance is resident in the outer sheath rather than the core unit structure. A rigid exo-skeleton on the core unit structure becomes topologically redundant, and in fact offsets fiber density gains by reducing packaging efficiency. Furthermore, a rigid exo-skeleton inhibits access to the fibers for splicing.

By selecting a foamed material that has a sufficiently low stress level associated with the flat portion of the curve (FIG. 4), the core units can be compressed within the cable as desired with minimal increase in the fiber contact loads, and hence minimal induction of transmission loss. A high compressibility avoids the problems of large hydrostatic stress components encountered with rubber and other near incompressible hyperelastic materials.

The preferred foam material is a highly expanded (>90%) polymer such as a polyolefin, created by introducing cellular voids within the base polymer. As specific examples, low density polyethylene and polypropylene are preferred. Such materials and the associated processing equipment are well established in the present manufacturing state of the art. The defining requirement of the foamed material is the compressive stress-strain curve. Specifically, the foamed material preferably should exhibit the elastic response shown in FIG. 4. Key characteristics are as follows:

1) The curve should exhibit a plateau resulting from cell wall elastic buckling, defined as a region of near constant, low stress (less than 100 psi) for compressive strains as high as 60%. The onset of the plateau should be between 5% and 10% compressive strain.

2) There should be no large "snap-over" loads prior to the onset of the plateau; i.e. the stress should increase in a smooth, monotonic, elastic fashion from zero to the plateau level.

3) At compression levels above 60%, the stress-strain curve may adopt an increasingly steep upward slope as the cell walls approach full collapse and the foam densifies. The exact slope is not significant.

4) It is desired that the entire stress-strain curve shall be elastic, with no permanent set of the material upon removal of the compressive load. However, under some conditions stress relaxation may be found desirable (i.e. for a fixed deflection, the stress decays to zero over time).

5) The foam should be highly compressible, as signified by the effective Poisson's ratio terms approaching zero, or the ratio of the shear to bulk moduli approaching two-thirds.

EXAMPLE

A foam composition consisting of low density polyethylene (LDPE) supplied by Union Carbide under the trade designation DFDA1253, was foamed utilizing $CO_2$ injection to produce a 2.5× volume expansion. The resulting foamed composition was tested and it exhibited a compressive stress-stain curve which closely duplicated that shown in FIG. 4.

Figure 6:
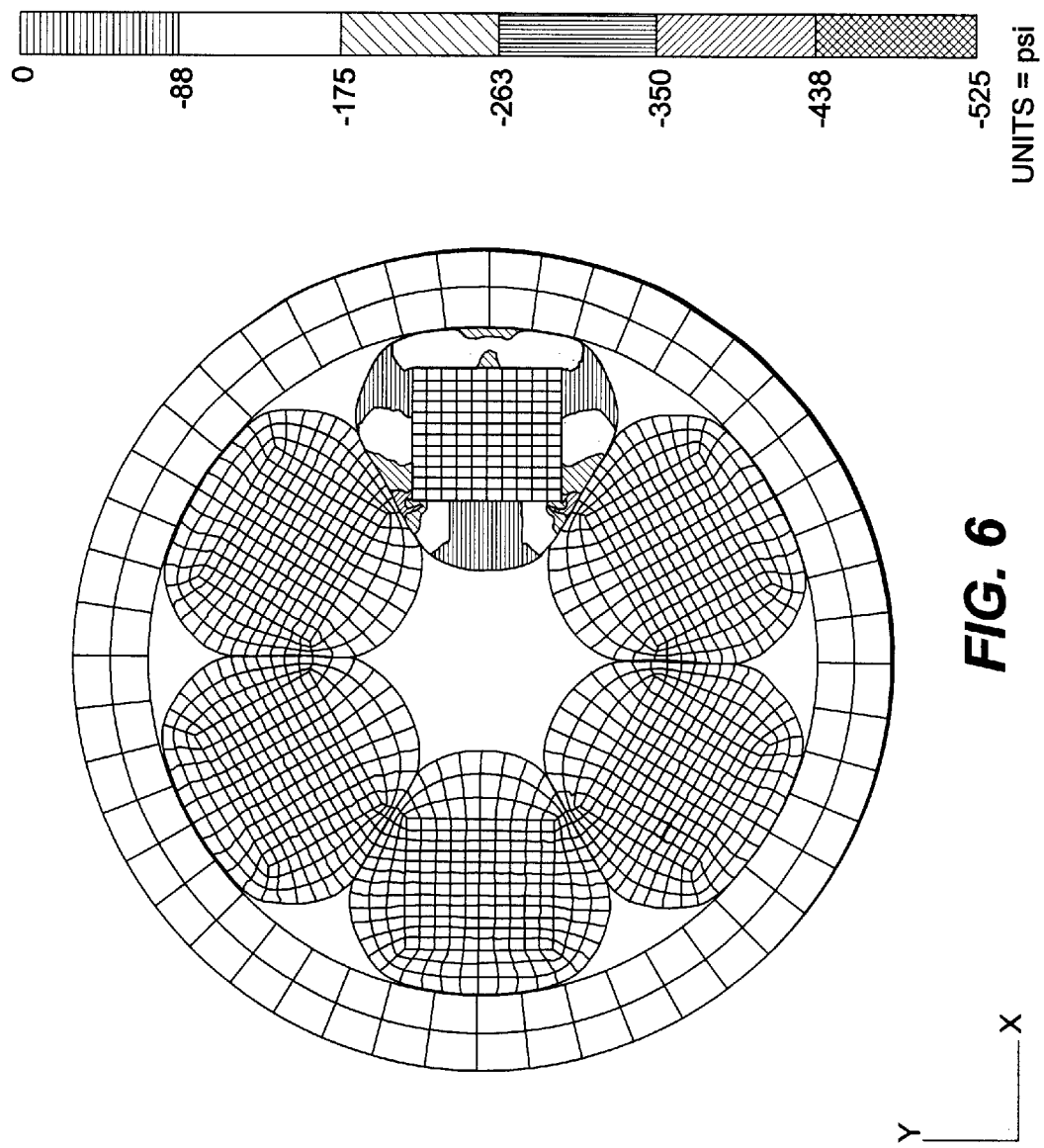
FIG. 6 is a finite element analysis contour plot of a compliant unitized structure cable cross section and showing minimum principal stress distribution for one of six 0.25" diameter unitized structures compressed within a 0.62" diameter cable sheath.

Finite element computer analysis used the measured foam data to simulate and analyze the assembly of six compliant core units, as shown in FIG. 6.

Figure 5:
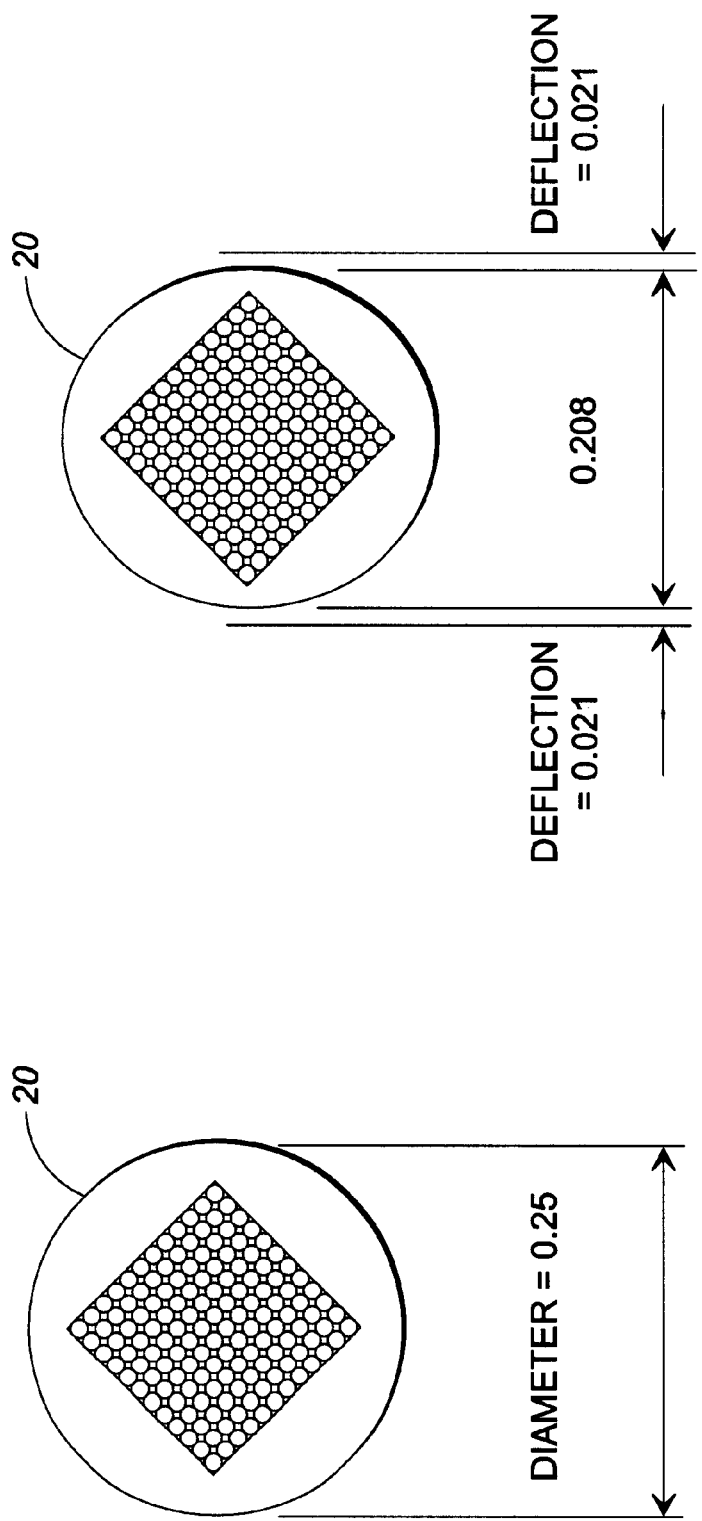
FIGS. 5A and 5B illustrate the cross sections of a compliant core unit under a no-load condition and a 30% compression load condition.

FIG. 5B illustrates a 30% compression deformation for a core unit composed of twelve twelve-fiber ribbons, and a foam composition as described in the above example.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical fiber cable comprising:
   at least one compliant core unit comprising at least one optical fiber enclosed in and supported by a unitizing structure which has an elastic response which is characterized by a nearly constant nominal stress plateau below about 100 psi for compressive strains up to about 60%, and
   an outer sheath enclosing and supporting said at least one core unit so as to permit relative movement between the core unit and the outer sheath, and
   wherein said unitizing structure is subjected to a compressive deformation by the contact between the one compliant core unit and the outer sheath.

2. The optical fiber cable as defined in claim 1 wherein said one compliant core unit comprises a bundle of parallel optical fibers.

3. The optical fiber cable as defined in claim 2 wherein said bundle of parallel optical fibers is of rectangular configuration in cross section.

4. The optical fiber cable as defined in claim 2 wherein said unitizing structure comprises an expanded polymeric foam which is extruded about the at least one optical fiber.

5. An optical fiber cable comprising:
   a plurality of compliant core units each comprising a bundle of parallel optical fibers enclosed in and supported by a compliant unitizing structure; said unitizing structure of each core unit comprising an expanded polymeric foam material which has an elastic response which is characterized by a nearly constant nominal stress plateau below about 100 psi for compressive strains up to about 60%, so as to effectively cushion the bundle of fibers from external stresses that are applied when the cable is bent, and
   an outer sheath enclosing and supporting said plurality of core units so as to permit relative movement between the core units and the outer sheath, and such that said polymeric foam material of each core unit is subjected to a compressive deformation by the contact between the core units and the outer sheath.

6. The optical fiber cable as defined in claim 5 wherein said polymeric foam material is selected from the group consisting of polyethylene and polypropylene.

7. The optical fiber cable as defined in claim 5 wherein said bundle of parallel optical fibers comprises a plurality of stacked ribbons, with each ribbon comprising a row of laterally aligned fibers.

8. The optical fiber cable as defined in claim 7 wherein the stacked ribbons are held to each other solely by said enclosing unitizing structure.

9. The optical fiber cable as defined in claim 7 wherein said stacked ribbons are retained under compression by the unitizing structure but are not otherwise secured to the unitizing structure or each other, and so that the ribbons are free to move relative to the unitizing structure and relative to each other.

* * * * *